US012706870B2

(12) United States Patent
Peng et al.

(10) Patent No.: US 12,706,870 B2
(45) Date of Patent: Aug. 11, 2026

(54) METHOD, APPARATUS AND ELECTRONIC DEVICE FOR INFORMATION INTERACTION

(71) Applicant: Beijing Zitiao Network Technology Co., Ltd., Beijing (CN)

(72) Inventors: Zhaoyuan Peng, Beijing (CN); Yichen Li, Beijing (CN); Bowen Shen, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 46 days.

(21) Appl. No.: 18/727,327

(22) PCT Filed: Jan. 3, 2023

(86) PCT No.: PCT/CN2023/070094

§ 371 (c)(1),
(2) Date: Jul. 8, 2024

(87) PCT Pub. No.: WO2023/131117

PCT Pub. Date: Jul. 13, 2023

(65) Prior Publication Data

US 2025/0097176 A1 Mar. 20, 2025

(30) Foreign Application Priority Data

Jan. 7, 2022 (CN) ......................... 202210018583.5

(51) Int. Cl.
*H04L 51/046* (2022.01)
*H04L 51/216* (2022.01)

(52) U.S. Cl.
CPC .......... *H04L 51/046* (2013.01); *H04L 51/216* (2022.05)

(58) Field of Classification Search
CPC ...... H04L 51/046; H04L 51/216; H04L 51/04
(Continued)

(56) References Cited

U.S. PATENT DOCUMENTS 11,729,130 B2 * 8/2023 Botwick ............... H04L 51/212 709/206
12,177,273 B2 * 12/2024 Eirinberg ............. H04L 65/403
(Continued)

FOREIGN PATENT DOCUMENTS

CN 108173738 A 6/2018
CN 108632127 A 10/2018
(Continued)

OTHER PUBLICATIONS

International Patent Application No. PCT/CN2023/070094; Int'l Written Opinion and Search Report; dated Mar. 28, 2023; 5 pages.
(Continued)

*Primary Examiner* — Ruolei Zong
(74) *Attorney, Agent, or Firm* — BakerHostetler

(57) ABSTRACT

Embodiments of the present disclosure disclose an information interaction method and apparatus and an electronic device. The method includes: displaying information of at least one first session, wherein the information of the first session includes a structured identifier, and the structured identifier includes at least one first field; and based on a received first preset operation performed on a target first field, displaying an information page associated with the target first field, such that different jump entries are set in information of a session, and an information page indicated by an operation of a user is jumped to based on the operation of the user, thereby improving the flexibility of information jumping.

20 Claims, 5 Drawing Sheets

(58) Field of Classification Search
USPC .......................................................... 709/206
See application file for complete search history.

(56) References Cited

U.S. PATENT DOCUMENTS

| | | | | |
|---|---|---|---|---|
| 2010/0107088 | A1* | 4/2010 | Hunt | H04L 51/043 715/752 |
| 2012/0158853 | A1* | 6/2012 | Baartman | H04L 12/1827 709/206 |
| 2013/0060871 | A1* | 3/2013 | Downes | H04L 12/1827 709/206 |
| 2017/0357442 | A1* | 12/2017 | Peterson | G06F 9/54 |
| 2018/0336569 | A1* | 11/2018 | Ritchie | H04L 51/58 |
| 2019/0036989 | A1* | 1/2019 | Eirinberg | H04L 67/34 |
| 2020/0007353 | A1 | 1/2020 | Wang et al. | |
| 2020/0034033 | A1* | 1/2020 | Chaudhri | H04L 51/043 |

FOREIGN PATENT DOCUMENTS

| | | | |
|---|---|---|---|
| CN | 111399709 | A | 7/2020 |
| CN | 112073289 | A | 12/2020 |
| CN | 112416482 | A | 2/2021 |
| CN | 112433654 | A | 3/2021 |
| CN | 113239172 | A | 8/2021 |
| CN | 113552978 | A | 10/2021 |

OTHER PUBLICATIONS

China Patent Application No. 202210018583.5; Office Action; dated Mar. 28, 2026; 16 pages.

* cited by examiner

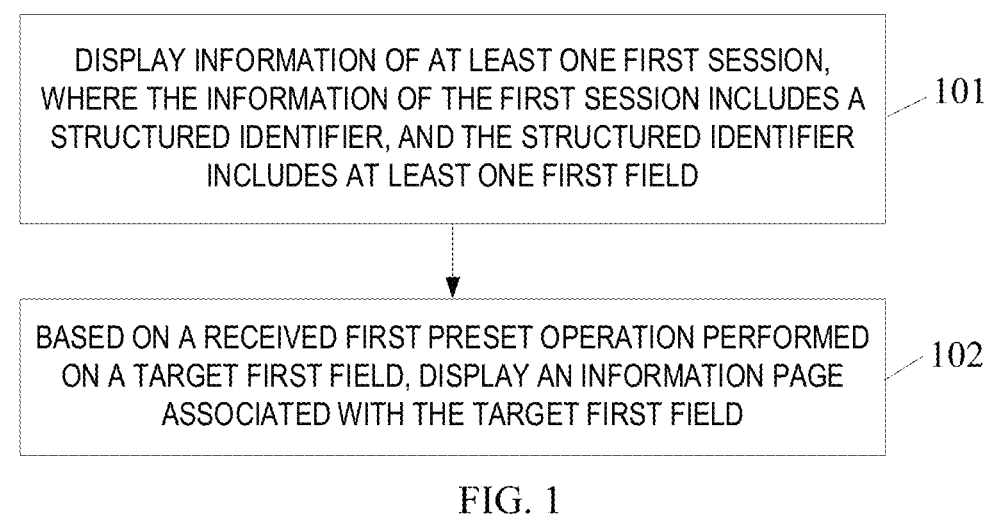

DISPLAY INFORMATION OF AT LEAST ONE FIRST SESSION, WHERE THE INFORMATION OF THE FIRST SESSION INCLUDES A STRUCTURED IDENTIFIER, AND THE STRUCTURED IDENTIFIER INCLUDES AT LEAST ONE FIRST FIELD — 101

BASED ON A RECEIVED FIRST PRESET OPERATION PERFORMED ON A TARGET FIRST FIELD, DISPLAY AN INFORMATION PAGE ASSOCIATED WITH THE TARGET FIRST FIELD — 102

FIG. 1

METHOD, APPARATUS AND ELECTRONIC DEVICE FOR INFORMATION INTERACTION

CROSS-REFERENCE TO RELATED APPLICATION

The present application is the U.S. National Stage of International Application No. PCT/CN2023/070094, filed on Jan. 3, 2023, which claims priority to Chinese Patent Application No. 202210018583.5, filed on Jan. 7, 2022, and entitled "Method, apparatus and electronic device for information interaction", which are incorporated herein by reference in their entireties.

FIELD

The present disclosure relates to the field of internet technologies, and in particular, to an information interaction method and apparatus and an electronic device.

BACKGROUND

With the development of internet technologies, a user may post information via the internet, and may exchange information with another user in real time.

Real-time information interaction may usually include a one-to-one chat and a group chat. Information of the one-to-one chat and group chat may be displayed on a page. The displayed information of the one-to-one chat or group chat may include identifier information of the one-to-one chat or group chat.

SUMMARY

The disclosure part is provided to describe in brief form the ideas, which will be described in detail in the following specific embodiments. The disclosure part is neither intended to identify the key features or necessary features of the technical solutions to be protected nor intended to be used to limit the scope of the technical solutions to be protected.

Embodiments of the present disclosure provide a method, apparatus and electronic device for information interaction.

In a first aspect, embodiments of the present disclosure provide a method for information interaction. The method includes: displaying information of at least one first session, wherein the information of the first session comprises a structured identifier, and the structured identifier comprises at least one first field; and based on a received first preset operation performed on a target first field, displaying an information page associated with the target first field.

In a second aspect, embodiments of the present disclosure provide an apparatus for information interaction. The apparatus includes: a first displaying unit, configured to display information of at least one first session, wherein the information of the first session comprises a structured identifier, and the structured identifier comprises at least one first field; and a second displaying unit, configured to display, based on a received first preset operation performed on a target first field, an information page associated with the target first field.

In a third aspect, embodiments of the present disclosure provide an electronic device, comprising: one or more processors; a storage device, configured to store one or more programs, wherein the one or more programs, when executed by the one or more processors, cause the one or more processors to implement the method of the first aspect.

In a fourth aspect, embodiments of the present disclosure provide a computer-readable storage medium, with a computer program stored thereon, wherein the program, when executed by a processor, implements steps of the method of the first aspect.

BRIEF DESCRIPTION OF THE SEVERAL VIEWS OF THE DRAWINGS

The foregoing and other features, advantages, and aspects of embodiments of the present disclosure will become more apparent in conjunction with the accompanying drawings and with reference to the following specific embodiments. Throughout the accompanying drawings, the same or similar numerals indicate the same or similar elements. It should be understood that the accompanying drawings are schematic and that the parts and elements therein are not necessarily drawn to scale.

FIG. 1 is a flowchart of some embodiments of a method for information interaction according to the present disclosure;

DETAILED DESCRIPTION

Figure 2:
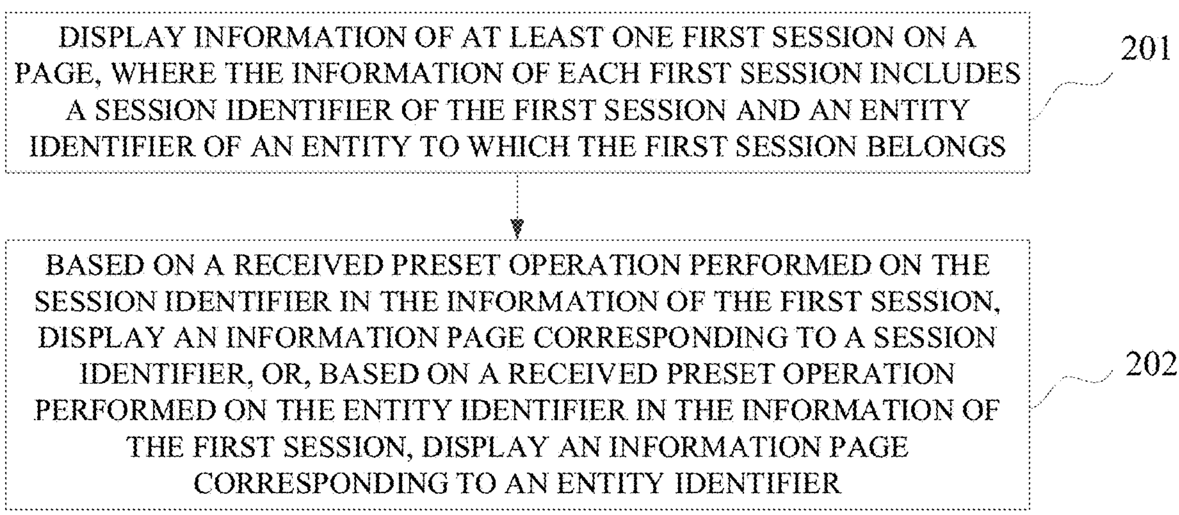
FIG. 2 is a flowchart of some other embodiments of a method for information interaction according to the present disclosure.

Embodiments of the present disclosure will be described in more detail below with reference to the accompanying drawings. Although certain embodiments of the disclosure are shown in the drawings, it should be understood that the disclosure may be embodied in various forms and should not be construed as limited to the embodiments set forth herein, but rather these embodiments are provided for thoroughness and clarity to fully understand this disclosure. It should be understood that the drawings and embodiments of the present disclosure are for illustrative purposes only and are not intended to limit the scope of the present disclosure.

It should be understood that various steps described in the method implementations of the present disclosure may be executed in different orders and/or in parallel. Furthermore, method embodiments may include additional steps and/or omit performance of illustrated steps. The scope of the present disclosure is not limited in this regard.

As used herein, the term "include" and its variations are open-ended, that is, "including but not limited to". The term "based on" means "based at least in part on". The term "an embodiment" means "at least one embodiment"; the term "another embodiment" means "at least one further embodiment"; the term "embodiments" means "at least some embodiments". Relevant definitions of other terms will be given in the description below.

It should be noted that concepts such as "first" and "second" mentioned in the present disclosure are only used to distinguish different devices, modules or units, and are not used to limit the order or interdependence of functions performed by these devices, modules or units.

It should be noted that the modifications of "one" and "a plurality of" mentioned in the present disclosure are illustrative and not restrictive. Those skilled in the art should understand that unless the context clearly indicates otherwise, it should be understood as "one or a plurality of".

The names of messages or information exchanged between a plurality of devices in the embodiments of the present disclosure are for illustrative purposes only and are not used to limit the scope of these messages or information.

Refer to FIG. 1, which shows a procedure of an embodiment of a method for information interaction according to the present disclosure. The information interaction method shown in FIG. 1 includes the following steps.

At step 101, information of at least one first session is displayed, where the information of the first session includes a structured identifier, and the structured identifier includes at least one first field.

At step 102, based on a received first preset operation performed on a target first field, an information page associated with the target first field is displayed.

The first session may be a one-to-one chat session or may be a group chat session.

The at least one first session includes a one-to-one chat session and/or a group chat session.

The one-to-one chat session may be a session between two individuals. The group chat session may be a session among a plurality of individuals.

The first session may be a session between two individuals or may be a session among a plurality of individuals.

The information of the first session may include at least some messages in the first session. In addition, the information of the first session may further include identifier information. The identifier information includes a structured identifier. The structured identifier includes at least one first field. In some application scenarios, the structured identifier may include more than two first fields.

In the present disclosure, a scenario of displaying the information of the at least one first session is not limited. That is, the information of the at least one first session may be displayed in different scenarios.

In an optional implementation, displaying the information of the at least one first session includes: displaying the information of the at least one first session in an information flow area of an instant messaging client.

In another optional implementation, displaying the information of the at least one first session includes: displaying the information of the at least one first session in a session interface of an interface of an instant messaging client.

In still another optional implementation, displaying the information of the at least one session includes: displaying the information of the at least one first session in a cloud document.

Each first field herein may be associated with a corresponding information page in advance.

The target first field may be one of the first fields. A user may determine the target first field from the at least one first field, and then perform the first preset operation on the target first field. After receiving the first preset operation performed by the user on the target first field, an execution object of the information interaction method may display the information page associated with the target first field.

Specifically, the above-mentioned execution object is a terminal device of the user. After receiving the first preset operation, the execution object may send, to a server, an acquisition request of acquiring an information page associated with a first field. The server may send, based on the acquisition request, content of the information page to the execution object, to enable the execution object to display the information page.

More than two first fields may be provided. The user may select any one of the first fields as the target first field. The user may open the information page associated with the target first field by performing the first preset operation on the selected target first field, that is, may jump to the information page associated with the target first field based on an operation performed by the user on the target first field.

In the information interaction method provided in this embodiment, information of at least one first session is displayed, wherein the information of the first session includes a structured identifier, and the structured identifier includes at least one first field; and based on a received first preset operation performed on a target first field, an information page associated with the target first field is displayed, such that different information jump entries are set in the structured identifier included in the information of the first session, and an information page indicated by an operation of a user is jumped to based on the operation of the user, thereby improving the flexibility of information jumping.

In some optional implementations, the method for information interaction further includes the following steps: based on a received page jump setting operation performed on a target identifier corresponding to the target first field, associating the target identifier with an information page corresponding to the page jump setting operation.

The structured identifier in the information of the first session may include a plurality of first fields. Each first field may correspond to one identifier. The identifier herein may include, for example, an identifier of the first session, an identifier of an entity to which the first session belongs, and the like.

The user may perform the page jump setting operation on any first field. For example, the page jump setting operation herein may include the following steps. First, a right click, a long-time touch, or another operation is performed on the target first field selected from the plurality of first fields to display a page jump setting window. An identifier corresponding to the target first field herein is a target identifier. Next, information of an information page associated with the target identifier is inputted into the page jump setting window. The information of the information page may include, for example, a link of the information page.

In these optional implementations, the page jump setting operation is performed on a target identifier of the displayed first session, to set a corresponding jump information page when the first preset operation is performed on the target identifier. In an aspect, the jump information page corresponding to the target identifier can be configured. In another aspect, the setting of the jump information page corresponding to the target identifier is facilitated.

In some other optional implementations, the information interaction method further includes the following steps: based on a received disassociation operation of an association information page performed by the user on the target first field, canceling an association relationship between the target field and an associated association information page, and setting the target first field to a common field.

In these optional implementations, the user may further perform the disassociation operation of the association information page on the target first field. Specifically, the disassociation operation includes the following steps: First, a right click, a long-time touch, or another operation is performed on the target first field selected from the plurality of first fields to display the page jump setting window. An identifier corresponding to the target first field herein is a target identifier. Next, the association relationship between the information page and the target identifier is canceled in the page jump setting window.

In an implementation, canceling the association relationship between the information page and the target identifier includes deleting a previous link of the information page corresponding to the target identifier.

After the disassociation operation of the user is received, the target first field is no longer associated with the information page. Subsequently, after the first preset operation performed by the user on the target first field is received, the previous information page associated with the target identifier is no longer displayed. If the target identifier corresponding to the target first field is no longer associated with the information page, the target first field may be considered as a common field.

In these optional implementations, for each first field corresponding to the structured identifier in the information of the first session, the association relationship between the identifier corresponding to the first field and the association information page may be canceled based on the disassociation operation of the user, such that an association relationship between an identifier and an information page is editable, making it convenient for the user to adjust the association relationship between the identifier and the corresponding information page.

Continuing to refer to FIG. 2, FIG. 2 shows a procedure of another embodiment of a method for information interaction according to the present disclosure. The method for information interaction shown in FIG. 2 includes the following steps.

At step 201, information of at least one first session is displayed, where the information of the first session includes a structured identifier, and the structured identifier of the first session includes a session identifier of the first session and an entity identifier of an entity to which the first session belongs.

At step 202, based on the received first preset operation performed on the session identifier in the information of the first session, a jump is made to display an information page corresponding to a session identifier indicated by the first preset operation; or, based on the received first preset operation performed on the entity identifier in the information of the first session, a jump is made to display an information page corresponding to an entity identifier indicated by the first preset operation.

In some application scenarios, the step 201 may include: displaying the information of the at least one first session in an information flow area of an interface of an instant messaging client.

The instant messaging client interface may display a plurality of filtering tabs. Each filtering tab corresponds to a preset filtering condition. A plurality of sessions may be filtered according to the preset filtering condition. When a user performs a triggering operation on a filtering tab, a plurality of messages obtained through filtering by using a filtering condition corresponding to the filtering tab may be displayed on an interface.

Figure 3A:
FIG. 3A shows a schematic display interface of information of a first session.

As shown in FIG. 3A, the filtering tab may include a tab "All" used for indicating all sessions, a tab "Unread" for a session with an unread message, a tab "One-to-one chat" used for indicating a session between two users, a tab "Handle later" used for indicating that a message is to be handled later, a tab "Team" used for indicating a team, and the like.

The information of the first session includes the structured identifier. The structured identifier includes the session identifier of the first session and the entity identifier of the entity to which the first session belongs.

The session identifier is used for distinguishing between different sessions. The session identifier may be set by the user, or may be automatically generated based on a user identifier of a user performing a session. The session identifier includes, but not limited to, characters, digits, and the like.

The entity to which the first session belongs includes one of the following: a team associated with the first session; and an organization to which a user corresponding to the first session belongs.

In some application scenarios, the entity to which the first session belongs may be the team associated with the first session. The team may be associated with a plurality of first sessions. The team may correspond to a first user set. A plurality of session users of each first session may correspond to one second user set. Each second user set may be a subset of the first user set.

The entity identifier may be a team identifier. The entity identifier may include, but not limited to, characters, digits, and the like.

When the entity to which the first session belongs is a team, the first session may be a group chat session of the team. In an information flow area (Feed flow area) of the instant messaging client interface, in addition to displaying the information of the first session, information of a common session (a one-to-one chat or a group chat), a document, notification messages of various assistants/robots (such as a calendar assistant) may further be displayed.

In the information of the first session, the session identifier and the entity identifier respectively correspond to corresponding first fields.

In these optional embodiments, the first field corresponding to the session identifier and the first field corresponding to the entity identifier may be adjacent fields.

The first field corresponding to the session identifier and the first field corresponding to the entity identifier may be connected by a preset connector. The preset connector herein may be any symbol, which is not limited herein.

Refer to FIG. 3A, which shows a schematic display interface of the information of the first session.

As shown in FIG. 3A, the instant messaging client interface may display information of the plurality of sessions. The plurality of sessions may include a one-to-one chat session, a group chat session, and the like. The information 30 of the first session includes a session identifier YYYY and an entity identifier XXXX. The first session corresponding to the information 30 of the first session is a single-entity session. In FIG. 3A, the entity identifier XXXX may correspond to a first field 301, and the session identifier YYYY may correspond to a first field 302. The first field 301 may be adjacent to the first field 302. A connector 303 may be set between the first field 301 and the first field 302. The information of the first session may further include message content 304. "Message content" in the figure does not have a substantial meaning, and may be replaced with any message content.

In a message of the first session, a display order of the entity identifier and the session identifier is not limited.

Optionally, the entity identifier XXXX may be set in front of the session identifier YYYY.

It needs to be noted that, "X" and "Y" in the present disclosure may be any characters. Moreover, a quantity of "Xs" in the entity identifier is not used as a limitation to a quantity of characters in the entity identifier. Similarly, a quantity of "Ys" in the session identifier is not used as a limitation to a quantity of characters in the session identifier.

In some application scenarios, the at least one first session includes a multi-entity first session, and each multi-entity first session corresponds to at least two entities; and entity identifiers in information of a session corresponding to a multi-entity first session include entity identifiers that respectively correspond to the at least two entities corresponding to the first session. Each entity identifier may correspond to one first field in one structured identifier.

Figure 3B:
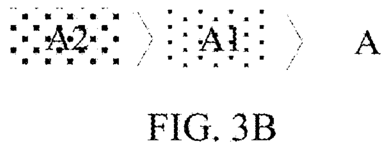
FIG. 3B is a schematic diagram of information of a multi-entity first session.

As a schematic description, a first session A (A is a session identifier) belongs to a first entity (an identifier of the first entity is A1) and a second entity (an identifier of the second entity is, for example, A2). Information of the first session A may include an identifier A1 of the first entity and an identifier A2 of the second entity. Optionally, the first entity A1 belongs to the second entity A2. The information of the first session A may display level by level the identifier A2 of the second entity, the identifier A1 of the first entity, and an identifier A of the first session A. The preset connector may be set between A2, A1, and A, as shown in FIG. 3B. The connector is used for separating the identifiers of different levels.

Preferably, different display types may be used for A2, A1, and A, such that a user recognizes identifiers of different levels.

The entity to which the first session belongs may be an organization to which the user belongs. The first entity and the second entity may be departments of different levels in an organization. For example, the second entity is a superior department in an organization, and the first entity is a subordinate department that is in the organization and belongs to the second entity.

The user may perform a preset operation on the information of the first session on the page. A corresponding information page may be entered based on the preset operation.

A user may perform the preset operation on the session identifier. After the user performs the preset operation on the session identifier, the information page corresponding to the session identifier may be displayed. The information page corresponding to the session identifier may be a page of a session indicated by the session identifier.

Optionally, the page of the session may be a session detail page. The session detail page may include at least one message in the session.

The user may browse the at least one message corresponding to the first session on the page of the information of the first session.

The entity is a team, and an information page corresponding to the entity identifier includes an information page of a target team indicated by the entity identifier.

The user may perform the preset operation on the entity identifier, and the information page of the target team indicated by the entity identifier may be displayed.

The information page of the target team may be a session list page corresponding to the target team, or may be a home page of the target team.

In some application scenarios, information displayed on the information page of the target team includes a session list corresponding to an identifier of the target team.

The target team may be associated with a plurality of first sessions. The session list displayed on the information page of the target team may include session identifiers that respectively correspond to the plurality of first sessions.

As a schematic description, an association page of the target team may display information of at least one session corresponding to the target team. Each session may include at least one message.

In these application scenarios, the user may perform the preset operation on the session identifier, such that at least one message corresponding to the session indicated by the session identifier may be displayed. The user may perform the preset operation on the entity identifier, such that an association page corresponding to a target entity indicated by the entity identifier may be displayed.

The preset operation may include a click, a touch, or another operation.

In this embodiment, in information of a first session, a session identifier and an entity identifier of an entity to which the session belongs are set; and based on a received preset operation, an information page corresponding to a session identifier indicated by the preset operation or an information page corresponding to the entity identifier is displayed, such that in the information of the session, different jump entries are set, and based on an operation of a user, an information page indicated by the operation of the user is jumped to, thereby improving the flexibility of information jumping.

In some optional embodiments, displaying the information of the at least one first session in 101 in the embodiment shown in FIG. 1 and in 201 in the embodiment shown in FIG. 2 above may include displaying the information of the at least one first session in an session interface of the instant messaging client.

Figure 3C:
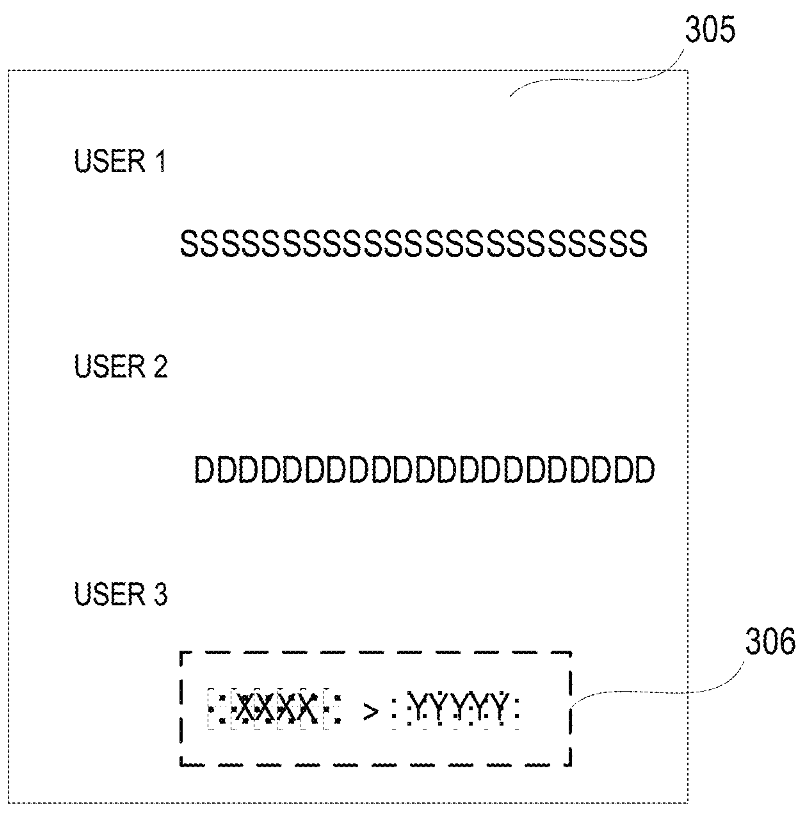
FIG. 3C shows another schematic display interface of information of a first session.

Refer to FIG. 3C, which is a schematic diagram of displaying the information of the first session in the session interface. As shown in FIG. 3C, a session interface 305 displayed by the instant messaging client may include message content of a session of a user 1, a user 2, and a user 3, for example, message content "SS . . . SS" sent by the user 1 in the session interface, message content "DD . . . SS" sent by the user 2 in the session interface, and message content 306 sent by the user 3 in the session. The message content 306 may include the information of the first session. The information of the first session includes the structured identifier. For example, the information of the first session shown in FIG. 3C includes a structured identifier "XXXX>YYYY". The information of the first session herein includes a session identifier "YYYY" and an entity identifier "XXXX". The session identifier "YYYY" and the entity identifier "XXXX" respectively correspond to the first field. By clicking any one of the session identifier and the entity identifier, the user may jump from the session interface 305 to an information page corresponding to the identifier selected by the user. For example, when the entity identifier "XXXX" is click, a displayed interface is jumped from the session interface 305 to the information page associated with the entity identifier "XXXX".

In some other optional embodiments, displaying the information of the at least one first session in 101 in the embodiment shown in FIG. 1 and in 201 in the embodiment shown in FIG. 2 above may include displaying the information of the first session in a cloud document. In an embodiment, a name card of the first session may be inserted into the cloud document. The name card of the first session may include the information of the first session. The structured identifier of the first session may include the session identifier of the first session and the entity identifier of the entity to which the first session belongs. Each of the session identifier of the first session and the entity identifier of the entity to which the first session belongs corresponds to one first field. The user may perform the preset operation on the session identifier in the information of the first session in the cloud document, to make displayed information jump to a detail page for the first session. Alternatively, the preset operation may be performed on the entity identifier in the information of the first session in the cloud document, to make the displayed information jump to the association page corresponding to the entity identifier.

In some optional embodiments, in the information of the first session, the entity identifier and the session identifier share one display space. A first display length used for displaying the entity identifier and the session identifier is less than or equal to a first preset length threshold.

That is, in the information of the first session, the entity identifier and the session identifier jointly occupy one display space. In the display space, at least part of the entity identifier and at least part of the session identifier may be included. The entity identifier and the session identifier do not have clear display space division therebetween.

The first preset length threshold may be represented by a size of an occupied display space.

The display space corresponding to the first preset length threshold may include a display space of any row. The first preset length threshold may be set according to an application scenario.

Preferably, the display space corresponding to the first preset length threshold is a display space of three rows.

The display space corresponding to the first display length may be a display space of one row, or a display space of two rows, or a display space of three rows.

Figure 4A:
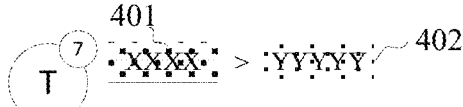
FIGS. 4A, 4B and 4C are schematic diagrams of display of information of a first session of the embodiment shown in FIG. 2.
Figure 4B:
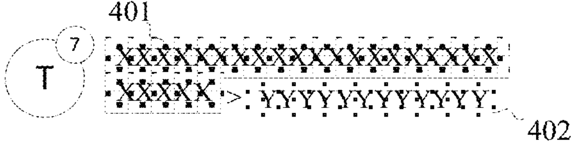
Figure 4C:
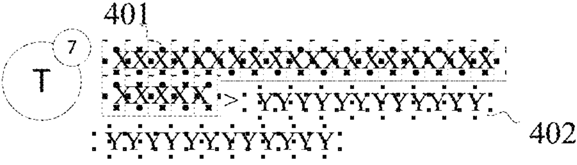

Refer to FIGS. 4A to 4C, which are schematic diagrams of display of information of a first session of the embodiment shown in FIG. 2.

As shown in FIG. 4A, a first display length 403 used for displaying an entity identifier "XXXX" 401 and a session identifier "YYYY" 402 in a session message of the first session may correspond to a display space of one row.

As shown in FIG. 4B, a first display length for displaying an entity identifier "XXXX . . . XXXX" 401 and a session identifier "YYYY . . . YYYY" 402 in a session message of the first session may correspond to a display space of two rows.

As shown in FIG. 4C, a first display length 403 for displaying an entity identifier 401 and a session identifier 402 in a session message of the first session may correspond to a display space of three rows.

In these optional embodiments, it is set that a display length for the session identifier and the entity identifier in the information of the first session is less than or equal to a preset length threshold, such that on the basis of that the information of the first session can schematically display the session identifier and the entity identifier of the first session, it is ensured that there is a sufficient space for displaying the message content in the first session in the display area of the information of the first session. This further helps to ensure the balance of a plurality of messages transferred by the information of the first session on the page.

In some optional embodiments, if the first display length occupied by the session identifier and the entity identifier is greater than the first preset length threshold, a truncation operation is performed on the session identifier and/or the entity identifier, and a session identifier and/or an entity identifier kept after the truncation operation are/is displayed.

In some application scenarios, when the first display length is greater than the first preset length threshold, the truncation operation may be performed on the session identifier, such that a display length for a session identifier part kept after the truncation operation and the entity identifier is less than or equal to the first preset length threshold.

In some other application scenarios, when the first display length is greater than the first preset length threshold, the truncation operation may be performed on the entity identifier, such that a display length for an entity identifier part kept after the truncation operation and the session identifier is less than or equal to the first preset length threshold.

In some other application scenarios, when the first display length is greater than the first preset length threshold, the truncation operation may be performed on the entity identifier and the session identifier, such that a display length for an entity identifier part and a session identifier part kept after the truncation operation is less than or equal to the first preset length threshold. In these application scenarios, the objective of the truncation operation on the entity identifier and the session identifier may be to implement that a total display length of kept parts after the two are truncated is less than the first preset length threshold.

In these optional embodiments, in a manner of truncating the session identifier and/or the entity identifier, an overall corresponding display length for the session identifier and the entity identifier kept after the truncation operation is less than the first preset length threshold, and a display space for the session identifier and the entity identifier of the first session is controlled.

In some optional embodiments, the entity identifier and the session identifier respectively correspond to independent display spaces. That is, in this optional embodiment, the entity identifier and the session identifier have clear display space division therebetween. The display space may be represented by a display length. In these optional embodiments, in the information of the first session, a display length used for displaying the session identifier is less than or equal to a second preset length threshold, and a display length used for displaying the entity identifier is less than or equal to a third preset length threshold.

The display spaces corresponding to the second preset length threshold and the third preset length threshold herein may be display spaces of any row. The second preset length threshold and the third preset length threshold may be set according to an application scenario.

A total of a display space corresponding to the third preset length threshold and a display space corresponding to the second preset length threshold is a display space of two rows or three rows.

Optionally, the number of rows of the display space corresponding to the second preset length threshold is less or equal to two.

That is, the display space corresponding to the second preset length threshold may be a display space of one row or may be a display space of two rows. The second preset length threshold may be set according to an application requirement.

Optionally, the display space corresponding to the third preset length threshold is a display space of one row; and the display space corresponding to the second preset length threshold is a display space of one row.

In these optional embodiments, a display space that corresponds to each of the second preset length threshold and the third preset length threshold is a display space of one row.

That is, in the information of the first session displayed on the page, the entity identifier occupies a display space of one row, and the session identifier occupies a display space of one row.

Figure 5:
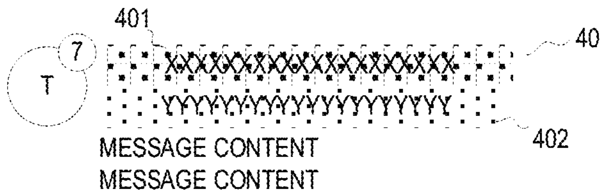
FIG. 5 is another schematic diagram of display of information of a first session in the embodiment shown in FIG. 2.

Refer to FIG. 5, which is another schematic diagram of display of information of a first session in the embodiment shown in FIG. 2.

As shown in FIG. 5, information of a first session 50 displayed on a page includes an entity identifier B1 and a session identifier B2. On the page, an entity identifier "XXXX . . . XXXX" 501 occupies a display space of one row, and a session identifier "YYYY . . . YYYY" 502 occupies a display space of one row.

It needs to be noted that, the information of the first session in the present disclosure further includes graphic display information of the first session, for example, graphics or information in large circles on the leftmost sides in the information of the sessions shown in FIG. 3A, FIGS. 4A to FIG. 4C, and FIG. 5, that is, prompt information of unread information in the sessions. The digit "7" in the small circles on the left sides in the information of the sessions shown in FIG. 3A, FIGS. 4A to FIG. 4C, and FIG. 5 represents that there are 7 unread messages in the sessions.

In these optional embodiments, the display spaces that respectively correspond to the entity identifier and the session identifier in the information of the first session are respectively controlled. In one aspect, the session identifier in the information of the first session and a display space ratio of the session identifier displayed in the information of the first session may be controlled, to control the balance of content of the information of the first session on the page. In another aspect, a user can clearly recognize the entity identifier and the session identifier in the information of the first session, such that the user performs a page jump operation on the entity identifier or the session identifier.

In some optional embodiments, if the display length for the session identifier of the first session is greater than the second preset length threshold, the session identifier is truncated based on the second preset length threshold, and if the display length for the entity identifier of the first session is greater than the third preset length threshold, the entity identifier is truncated based on the second preset length threshold.

In the present disclosure, during the truncation of the session identifier or the entity identifier, identification characters of the session identifier or the entity identifier may be removed in a back-to-front order. Alternatively, identification characters of the session identifier or the entity identifier may be removed in a front-to-back order.

Through the truncation operation, a display length of a kept session identifier is less than or equal to the second preset length threshold.

Alternatively, a display length of a kept entity identifier is less than or equal to the third preset length threshold.

Through the truncation operation, it can be ensured that display spaces that are respectively occupied by the session identifier and the entity identifier in the information of the first session are within respective preset display spaces, to ensure the balance of display content of the information of the first session on the page.

Figure 6:
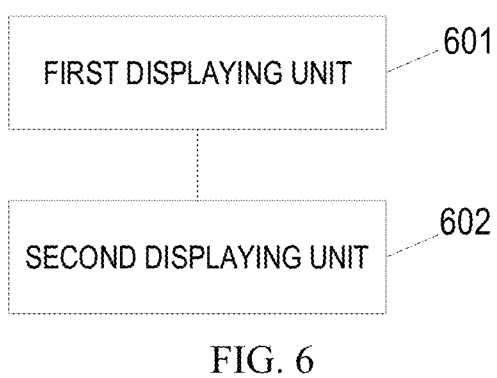
FIG. 6 is a schematic structural diagram of an embodiment of an apparatus for information interaction according to the present disclosure.

With further reference to FIG. 6, as an implementation of the methods shown in the above figures, the present disclosure provides an embodiment of an apparatus for information interaction. The apparatus embodiments correspond to the method embodiments shown in FIG. 1. The apparatus may be specifically applied in various electronic devices.

As shown in FIG. 6, the apparatus for information interaction of this embodiment includes a first displaying unit 601 and a second displaying unit 602. The first displaying unit 601 is configured to display information of at least one first session, wherein the information of the first session comprises a structured identifier, and the structured identifier comprises at least one first field and the second displaying unit 602 is configured to display, based on a received first preset operation performed on a target first field, an information page associated with the target first field.

In this embodiment, the specific processing of the first displaying unit 601 and the second displaying unit 602 of the apparatus for information interaction, as well as the technical effects they bring, may be referred to the relevant explanations of steps 101 and 102 in the corresponding embodiment of FIG. 1, and will not be repeated here.

In some optional implementations, the structured identifier of the first session comprises a session identifier of the first session and an entity identifier of an entity to which the first session belongs; and the second displaying unit 602 is further configured to, based on the received first preset operation performed on the session identifier in the information of the first session, jump to display an information page corresponding to a session identifier indicated by the first preset operation; or, based on the received first preset operation performed on the entity identifier in the information of the first session, jump to display an information page corresponding to an entity identifier indicated by the first preset operation.

In some optional implementations, the first displaying unit 601 is further configured to display the information of the at least one first session in an information flow area of an interface of an instant messaging client; or display the information of the at least one first session in a session interface of an interface of an instant messaging client; or display the information of the at least one first session in a cloud document.

In some optional implementations, in the information of the first session, the session identifier and the entity identifier respectively correspond to respective first fields. In some optional implementations, the at least one first session comprises a multi-entity first session, and each multi-entity first session corresponds to at least two entities; and entity identifiers in information of a session corresponding to a multi-entity first session comprise entity identifiers that respectively correspond to the at least two entities corresponding to the first session.

In some optional implementations, the entity to which the first session belongs comprises one of the following: a team associated with the first session; or an organization to which a user corresponding to the first session belongs.

In some optional implementations, an information page corresponding to the session identifier comprises a session detail page; and/or the entity is a team, and an information page corresponding to the entity identifier comprises an information page of a target team indicated by the entity identifier.

In some optional implementations, the entity identifier and the session identifier share one display space, and in information of the first session, a first display length used for displaying the entity identifier and the session identifier is less than or equal to a first preset length threshold; or the entity identifier and the session identifier respectively correspond to independent display spaces, and in information of the first session, a display length used for displaying the session identifier is less than or equal to a second preset length threshold, and a display length used for displaying the entity identifier is less than or equal to a third preset length threshold.

In some optional implementations, if the entity identifier and the session identifier share one display space, the first preset length threshold corresponds to a display space of two rows or three rows; and if the entity identifier and the session identifier respectively correspond to independent display spaces, a total of a display space corresponding to the third preset length threshold and a display space corresponding to the second preset length threshold is a display space of two rows or three rows. In some optional implementations, when the entity identifier and the session identifier share one display space, if the first display length occupied by the session identifier and the entity identifier is greater than the first preset length threshold, performing a truncation operation on the session identifier and/or the entity identifier; and when the entity identifier and the session identifier respectively correspond to independent display spaces, if the display length for the session identifier of the first session is greater than the second preset length threshold, truncating the session identifier based on the second preset length threshold, and if the display length for the entity identifier of the first session is greater than the third preset length threshold, truncating the entity identifier based on the third preset length threshold.

In some optional implementations, the at least one first session comprises a one-to-one chat session and/or a group chat session.

In some optional implementations, the apparatus for information interaction further includes a setting unit (not shown in the figure). The setting unit is configured to based on a received page jump setting operation performed on a target identifier corresponding to the target first field, associate the target identifier with an information page corresponding to the page jump setting operation.

In some optional implementations, the setting unit is further configured to based on a received disassociation operation performed by a user on a target identifier corresponding to the target first field, cancel an association relationship between the target field and an associated association information page, and set the target first field to a common field.

Figure 7:
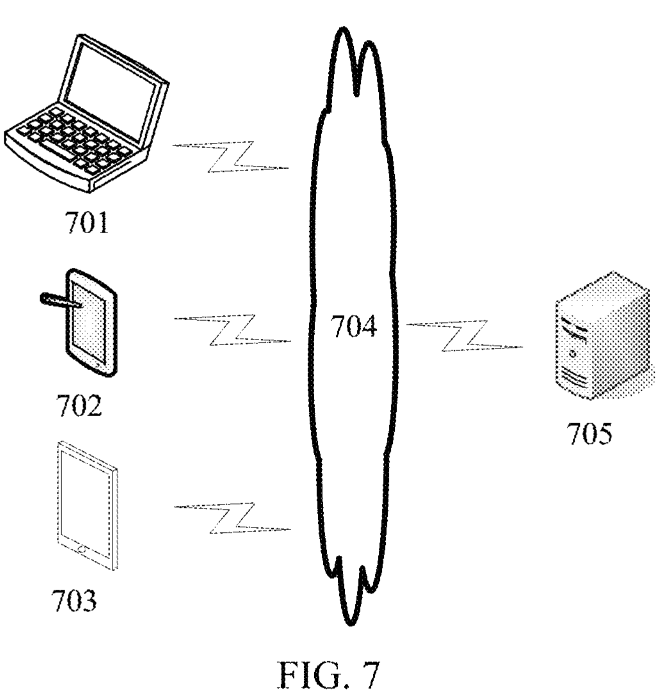
FIG. 7 is an example system architecture to which a method for information interaction in an embodiment of the present disclosure is applicable.

Reference is made to FIG. 7, which illustrates an example system architecture to which a method for information interaction in an embodiment of the present disclosure is applicable.

As shown in FIG. 7, the system architecture may include terminals 701, 702, and 703, a network 704, and a server 705. The network 704 is a medium providing a communication link between the terminals 701, 702, 703 and the server 705. The network 704 may include various connection types, such as wired, wireless communication links, or fiber optic cables, etc.

The terminals 701, 702 and 703 may interact with the server 705 through the network 704 to receive or send messages and the like. Various client applications, such as web browser applications, search applications, and news information applications, may be installed on the terminals 701, 702 and 703. The client applications in the terminals 701, 702 and 703 may receive a user instruction, and implement corresponding functions according to the user instruction, for example, display the information flow of the instant messaging application according to the user instruction.

The terminals 701, 702 and 703 may be hardware or software. In a case of hardware, the terminals 701, 702 and 703 may be various electronic devices with a display screen and supporting web browsing, including but not limited to smartphones, tablets, e-book readers, MP3 players (Moving Picture Experts Group Audio Layer III), MP4 (Moving Picture Experts Group Audio Layer IV) players, laptops and desktop computers. In a case of software, the terminals 701, 702 and 703 may be installed in the electronic devices listed above. The terminals 701, 702 and 703 may be implemented as multiple software or software modules (e.g., software or software modules for providing distributed services), or may be implemented as a single software or software module. There is no specific limitation herein.

The server 705 may provide various services, such as receiving information display requests sent by the terminals 701, 702, and 703, analyzing and processing the information display requests, and sending analysis and processing results (such as communication information corresponding to the display requests) to terminals 701, 702, and 703.

It is to be noted that the method for information interaction provided by the embodiments of the present disclosure can be executed by a terminal, and accordingly, the apparatus for information interaction may be provided in the terminals 701, 702, and 703. In addition, the method for information interaction provided by the embodiments of the present disclosure may also be executed by the server 705. Correspondingly, the apparatus information interaction may be provided in the server 705.

It should be understood that the numbers of terminal devices, networks and servers in FIG. 7 are merely illustrative. The number of terminal devices, the number of networks and the number of servers may be set as needed.

Figure 8:
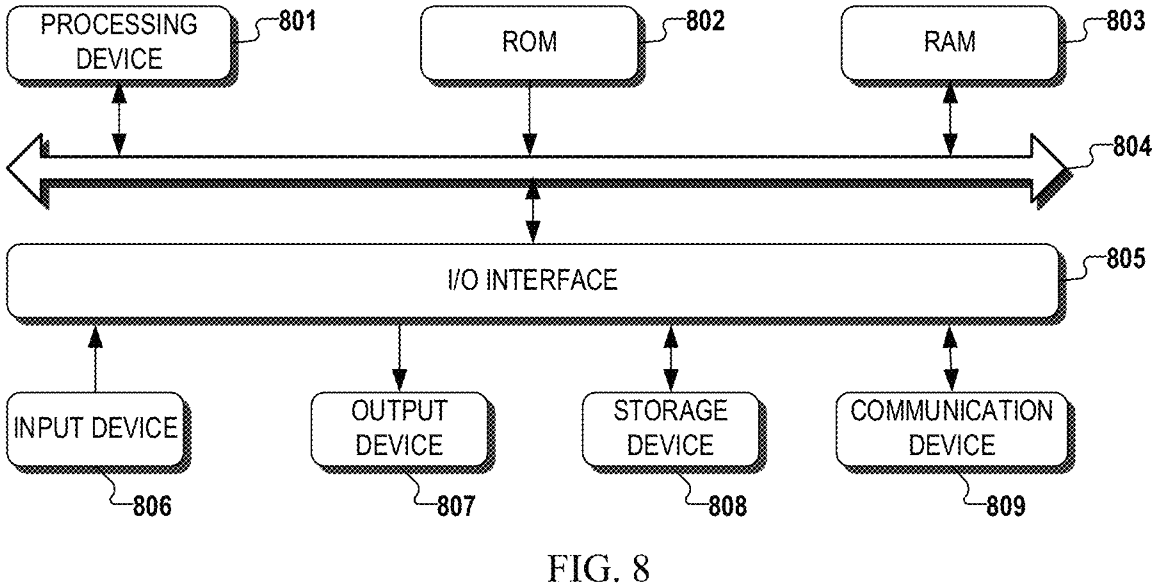
FIG. 8 is a schematic diagram of a basic structure of an electronic device provided in an embodiment of the present disclosure.

Reference is made to FIG. 8 next, which is a schematic structural diagram illustrating an electronic device (e.g., a terminal device or a server in FIG. 7) suitable for implementing the embodiments of the present disclosure. The terminal device in this embodiment of the present disclosure may include but is not limited to a mobile terminal such as a mobile phone, a notebook computer, a digital broadcast receiver, a PDA (Personal Digital Assistant), a PAD (Tablet Computer), a PMP (Portable Multimedia Player), an in-vehicle terminal (e.g., in-vehicle navigation terminal) and the like, as well as a stationary terminal such as a digital TV, a desktop computer, and the like. The electronic device shown in FIG. 8 is only an example and should not impose any restrictions on the functions and scope of use of the embodiments of the present disclosure.

As shown in FIG. 8, the electronic device may include a processing device (e.g., a central processing unit, a graphics processing unit, etc.) 801. The processing device 801 may perform various appropriate actions and processing according to a program stored in a read only memory (ROM) 802 or a program loaded from a storage device 808 into a random-access memory (RAM) 803. In the RAM 803, various programs and data necessary for the operation of the electronic device 800 are also stored. The processing device 801, the ROM 802, and the RAM 803 are connected to each other via a bus 804. An input/output (I/O) interface 805 is also connected to the bus 804.

Generally, the following components may be connected to the I/O interface 805: an input device 806 including, for example, a touch screen, a touch pad, a keyboard, a mouse, a camera, a microphone, an accelerometer, and a gyroscope; an output device 807 including, for example, a liquid crystal display (LCD), a speaker and a vibrator; a storage device 808 including, for example, a tape and a hard disk; and a communication device 809. The communication device 809 may allow the electronic device 800 to communicate wirelessly or by wire with other devices to exchange data. Although FIG. 8 shows the electronic device having various devices, it should be understood that not all of the illustrated devices are necessarily implemented or provided. Instead, more or fewer devices may be implemented or provided.

In particular, the processing described above with reference to the flowcharts may be implemented as computer software programs according to an embodiment of the present disclosure. For example, a computer program product is provided according to an embodiment of the present disclosure. The computer program product includes a computer program carried by a non-transitory computer readable medium. The computer program includes program code for performing the method shown in the flowchart. In such embodiment, the computer program may be downloaded and installed from the network via the communication device 809, or from the storage device 808, or from the ROM 802. The computer program, when being executed by the processing device 801, implements the functionalities defined in the method according to the embodiment of the present disclosure.

It should be noted that the computer readable medium according to the present disclosure may be a computer readable signal medium or a computer readable storage medium, or any combination of the above two. The computer readable storage medium may be, for example, but not limited to, an electrical, magnetic, optical, electromagnetic, infrared, or semiconductor system, apparatus or device, or a combination of any of the above. More specific examples of the computer readable storage medium may include, but are not limited to, an electrical connection with one or more wires, a portable computer disk, a hard disk, a random-access memory (RAM), a read only memory (ROM), an erasable programmable read only memory (EPROM or flash memory), an optical fiber, a portable compact disk read only memory (CD-ROM), an optical storage device, a magnetic storage device, or any suitable combination of the above. According to the present disclosure, the computer readable storage medium may be any tangible medium that contains or stores a program. The program may be used by or in conjunction with an instruction execution system, apparatus or device. In the present disclosure, the computer readable signal medium may include a data signal propagated in baseband or as part of a carrier wave with computer readable program code embodied thereon. The data signal propagated in this manner may be in various forms, including but not limited to an electromagnetic signal, an optical signal, or any suitable combination of the foregoing. The computer readable signal medium may also be any computer readable medium other than the computer readable storage medium. The computer readable signal medium may transmit, propagate, or transport the program for use by or in connection with the instruction execution system, apparatus, or device. The program code embodied on the computer readable medium may be transmitted over any suitable medium including, but not limited to, an electrical wire, an optical fiber cable, RF (radio frequency), or any suitable combination of the foregoing.

In some embodiments, the client terminal and the server may perform communications based on any currently known or future developed network protocol such as HTTP (Hypertext Transfer Protocol), and may be interconnected with any form or medium of digital data communication (e.g., a communication network). Examples of the communication network include a local area network ("LAN"), a wide area network ("WAN"), an international network (e.g., the Internet), and a peer-to-peer network (e.g., the ad hoc peer-to-peer network), as well as any currently known or future developed networks.

The computer readable medium may be included in the electronic device, or may exist alone without being incorporated into the electronic device.

The computer readable medium carries one or more programs that, when being executed by the electronic device, cause the electronic device to display information of at least one first session, wherein the information of the first session comprises a structured identifier, and the structured identifier comprises at least one first field; and display, based on a received first preset operation performed on a target first field, an information page associated with the target first field.

In some embodiments, the structured identifier of the first session comprises a session identifier of the first session and an entity identifier of an entity to which the first session belongs; and based on the received first preset operation performed on the target first field, performing a jump operation corresponding to the target first field, comprises: based on the received first preset operation performed on the session identifier in the information of the first session, jumping to display an information page corresponding to a session identifier indicated by the first preset operation; or, based on the received first preset operation performed on the entity identifier in the information of the first session, jumping to display an information page corresponding to an entity identifier indicated by the first preset operation.

In some embodiments, displaying the information of the at least one first session comprises: displaying the information of the at least one first session in an information flow area of an interface of an instant messaging client; or displaying the information of the at least one first session in a session interface of an interface of an instant messaging client; or displaying the information of the at least one first session in a cloud document.

In some embodiments, in the information of the first session, the session identifier and the entity identifier respectively correspond to respective first fields.

In some embodiments, the at least one first session comprises a multi-entity first session, and each multi-entity first session corresponds to at least two entities; and entity identifiers in information of a session corresponding to a multi-entity first session comprise entity identifiers that respectively correspond to the at least two entities corresponding to the first session.

In some embodiments, the entity to which the first session belongs comprises one of the following: a team associated with the first session; or an organization to which a user corresponding to the first session belongs.

In some embodiments, the entity identifier and the session identifier share one display space, and in information of the first session, a first display length used for displaying the entity identifier and the session identifier is less than or equal to a first preset length threshold; or the entity identifier and the session identifier respectively correspond to independent display spaces, and in information of the first session, a display length used for displaying the session identifier is less than or equal to a second preset length threshold, and a display length used for displaying the entity identifier is less than or equal to a third preset length threshold.

In some embodiments, if the entity identifier and the session identifier share one display space, the first preset length threshold corresponds to a display space of two rows or three rows; and if the entity identifier and the session identifier respectively correspond to independent display spaces, a total of a display space corresponding to the third preset length threshold and a display space corresponding to the second preset length threshold is a display space of two rows or three rows.

In some embodiments, when the entity identifier and the session identifier share one display space, if the first display length occupied by the session identifier and the entity identifier is greater than the first preset length threshold, performing a truncation operation on the session identifier and/or the entity identifier; and when the entity identifier and the session identifier respectively correspond to independent display spaces, if the display length for the session identifier of the first session is greater than the second preset length threshold, truncating the session identifier based on the second preset length threshold, and if the display length for the entity identifier of the first session is greater than the third preset length threshold, truncating the entity identifier based on the third preset length threshold.

In some embodiments, the at least one first session comprises a one-to-one chat session and/or a group chat session.

In some embodiments, an information page corresponding to the session identifier comprises a session detail page; and/or the entity is a team, and an information page corresponding to the entity identifier comprises an information page of a target team indicated by the entity identifier.

In some embodiments, when the one or more programs are executed by the electronic device, the electronic device is caused to, based on a received page jump setting operation performed on a target identifier corresponding to the target first field, associate the target identifier with an information page corresponding to the page jump setting operation.

In some embodiments, when the one or more programs are executed by the electronic device, the electronic device is caused to, based on a received disassociation operation performed by a user on a target identifier corresponding to the target first field, cancel an association relationship between the target field and an associated association information page, and setting the target first field to a common field.

The computer program code for performing operations according to the present disclosure may be written in one or more programming languages, or a combination thereof. Such programming languages include, but are not limited to, object-oriented programming languages, such as Java, Smalltalk, C++, and conventional procedural programming languages, such as the "C" language or similar programming languages. The program code may be executed entirely on a user computer, partly on a user computer, as a stand-alone software package, partly on a user computer and partly on a remote computer, or entirely on a remote computer or server. In the case of a remote computer, the remote computer may be connected to a user computer over any kind of network, including a local area network (LAN) or a wide area network (WAN), or may be connected to an external computer (e.g., over the Internet provided by an Internet service provider).

The flowcharts and block diagrams in the drawings illustrate the architecture, functionality, and operation of possible implementations of systems, methods and computer program products according to various embodiments of the present disclosure. In this regard, each block in the flowchart or block diagrams may represent a module, segment, or portion of code. The module, segment, or portion of code contains one or more executable instructions for implementing the specified logical functionalities. It should be noted that, in some alternative implementations, the functionalities noted in the blocks may be performed in an order different from the order noted in the drawings. For example, two blocks shown in succession may in fact be performed concurrently or in reverse, depending upon the functionalities involved. It should further be noted that each block in the block diagrams and/or flowcharts and combinations of blocks in the block diagrams and/or flowcharts may be implemented by special purpose hardware-based systems that perform specified functionalities or operations, or by combinations of special purpose hardware and computer instructions.

The units involved in the embodiments of the present disclosure may be implemented in software or hardware. The name of a unit does not, in any case, constitute a limitation on the unit itself.

The functionalities described herein above may be performed, at least in part, by one or more hardware logic components. For example, without limitation, illustrative hardware logic components that may be used include: Field Programmable Gate Array (FPGA), Application Specific Integrated Circuit (ASIC), Application Specific Standard Products (ASSP), Systems on Chip (SOC), Complex Programmable Logic Device (CPLD) and so on.

In the context of the present disclosure, a machine-readable medium may be a tangible medium that may contain or store a program for use by or in connection with the instruction execution system, apparatus or device. The machine-readable medium may be a machine-readable signal medium or a machine-readable storage medium. The machine-readable medium may include, but is not limited to, electronic, magnetic, optical, electromagnetic, infrared, or semiconductor systems, apparatuses, or devices, or any suitable combination of the foregoing. More specific examples of the machine-readable storage medium may include: an electrical connection based on one or more wires, a portable computer disk, a hard disk, a random-access memory (RAM), a read only memory (ROM), an erasable programmable read only memory (EPROM or flash memory), a fiber optic cable, a portable compact disk read only memory (CD-ROM), an optical storage device, a magnetic storage device, or any suitable combination of the foregoing.

The above description merely shows preferred embodiments according to the present disclosure and an illustration of the technical principles employed. Those skilled in the art should understand that the scope of disclosure involved in the present disclosure should cover other technical solutions formed by any combination of the above technical features or their equivalents without departing from the above disclosed concept, for example, a technical solution formed by replacing the above features with technical features (but not limited to) having functions similar to that disclosed in the present disclosure, rather than being limited to the technical solutions formed by the specific combination of the above technical features.

Additionally, although operations are illustrated in a particular order, the operations should not be construed as being performed in the particular order shown or in a sequential order necessarily. Under certain circumstances, multitasking and parallel processing may be advantageous. Likewise, the several implementation-specific details discussed above should not be construed as limitations on the scope of the present disclosure. Some features that are described in the context of separate embodiments may also be implemented in combination in a single embodiment. Alternatively, various features that are described in the context of a single embodiment may also be implemented in multiple embodiments separately or in any suitable sub-combination.

Although the subject matter has been described in languages specific to structural features and/or logical acts of method, it should understand that the subject matter defined in the appended claims is unnecessarily limited to the specific features or acts described above. Instead, the features and acts described above are merely example forms of implementing the claims.

We claim:

1. A method for information interaction, comprising:

displaying information of at least one first session, wherein the information of the at least one first session comprises a structured identifier, and the structured identifier comprises a plurality of selectable fields, wherein the plurality of selectable fields comprises a first selectable field corresponding to a session identifier of the at least one first session and a second selectable field corresponding to an entity identifier of a first entity to which the at least one first session belongs; and based on a received preset operation performed on the second selectable field, switching from displaying the information of the at least one first session to displaying an information page associated with the entity identifier.

2. The method according to claim 1, based on the received first preset operation performed on the further comprising:

based on a received first preset operation performed on the session identifier in the information of the first session, jumping to display an information page corresponding to the session identifier.

3. The method according to claim 1, wherein displaying the information of the at least one first session comprises:

displaying the information of the at least one first session in an information flow area of an interface of an instant messaging client; or displaying the information of the at least one first session in a session interface of an interface of an instant messaging client; or displaying the information of the at least one first session in a cloud document.

4. The method according to claim 1, wherein in the information of the at least one first session, the session identifier, and the entity each correspond to a different one of the plurality of selectable fields.

5. The method according to claim 1, wherein the at least one first session comprises a multi-entity first session, and the multi-entity first session corresponds to at least the first entity and a second entity, and wherein the plurality of selectable fields comprises a third selectable field corresponding to an entity identifier of the second entity.

6. The method according to claim 1, wherein the first entity to which the at least one first session belongs comprises one of the following:

a team associated with the at least one first session; or an organization to which a user corresponding to the at least one first session belongs.

7. The method according to claim 1, wherein the entity identifier and the session identifier share one display space, and in information of the at least one first session, a first display length used for displaying the entity identifier and the session identifier is less than or equal to a first preset length threshold; or the entity identifier and the session identifier respectively correspond to independent display spaces, and in information of the at least one first session, a display length used for displaying the session identifier is less than or equal to a second preset length threshold, and a display length used for displaying the entity identifier is less than or equal to a third preset length threshold.

8. The method according to claim 7, wherein if the entity identifier and the session identifier share one display space, the first preset length threshold corresponds to a display space of two rows or three rows; and if the entity identifier and the session identifier respectively correspond to independent display spaces, a total of a display space corresponding to the third preset length threshold and a display space corresponding to the second preset length threshold is a display space of two rows or three rows.

9. The method according to claim 7, wherein when the entity identifier and the session identifier share one display space, if the first display length occupied by the session identifier and the entity identifier is greater than the first preset length threshold, performing a truncation operation on the session identifier or the entity identifier; and when the entity identifier and the session identifier respectively correspond to independent display spaces, if the display length for the session identifier of the at least one first session is greater than the second preset length threshold, truncating the session identifier based on the second preset length threshold, and if the display length for the entity identifier of the first session is greater than the third preset length threshold, truncating the entity identifier based on the third preset length threshold.

10. The method according to claim 1, wherein the at least one first session comprises at least one of a one-to-one chat session and a group chat session.

11. The method according to claim 1, wherein an information page corresponding to the session identifier comprises a session detail page; or the first entity is a team, and an information page corresponding to the entity identifier of the first entity comprises an information page of a target team indicated by the entity identifier.

12. The method according to claim 1, the method further comprising:

based on a received page jump setting operation performed on the second selectable field, associating the entity identifier with an information page corresponding to the page jump setting operation.

13. The method according to claim 1, the method further comprising:

based on a received disassociation operation performed by a user on the second selectable field, canceling an association relationship between the second selectable field and an associated association information page, and setting the second selectable field to a common field.

14. An electronic device, comprising:

one or more processors;

a storage device, configured to store one or more programs, wherein the one or more programs, when executed by the one or more processors, cause the one or more processors to implement acts comprising:

displaying information of at least one first session, wherein the information of the at least one first session comprises a structured identifier, and the structured identifier comprises a plurality of selectable fields, wherein the plurality of selectable fields comprises a first selectable field corresponding to a session identifier of the at least one first session and a second selectable field corresponding to an entity identifier of a first entity to which the at least one first session belongs; and based on a received preset operation performed on the second selectable field, switching from displaying the information of the at least one first session to displaying an information page associated with the entity identifier.

15. A non-transitory computer-readable storage medium, with a computer program stored thereon, wherein the program, when executed by a processor, implements acts comprising:

displaying information of at least one first session, wherein the information of the at least one first session comprises a structured identifier, and the structured identifier comprises a plurality of selectable fields, wherein the plurality of selectable fields comprises a first selectable field corresponding to a session identifier of the at least one first session and a second selectable field corresponding to an entity identifier of a first entity to which the at least one first session belongs; and based on a received preset operation performed on the second selectable field, switching from displaying the information of the at least one first session to displaying an information page associated with the entity identifier.

16. The device according to claim 14, based on the received first preset operation performed on the further comprising:

based on a received preset operation performed on the session identifier in the information of the first session, jumping to display an information page corresponding to the session identifier.

17. The device according to claim 14, wherein displaying the information of the at least one first session comprises:

displaying the information of the at least one first session in an information flow area of an interface of an instant messaging client; or displaying the information of the at least one first session in a session interface of an interface of an instant messaging client; or displaying the information of the at least one first session in a cloud document.

18. The device according to claim 14, wherein in the information of the at least one first session, the session identifier, and the entity each correspond to a different one of the plurality of selectable fields.

19. The device according to claim 14, wherein the at least one first session comprises a multi-entity first session, and the multi-entity first session corresponds to at least the first entity and a second entity, and wherein the plurality of selectable fields comprises a third selectable field corresponding to an entity identifier of the second entity.

20. The device according to claim 14, wherein the first entity to which the at least one first session belongs comprises one of the following:

a team associated with the at least one first session; or an organization to which a user corresponding to the at least one first session belongs.

* * * * *